(12) United States Patent
Kallio et al.

(10) Patent No.: US 8,726,377 B2
(45) Date of Patent: May 13, 2014

(54) MALWARE DETERMINATION

(75) Inventors: Jussi Kallio, Helsinki (FI); Pirkka Palomäki, Saratoga, CA (US); Jarno Niemelä, Espoo (FI); Veli-Jussi Kesti, Espoo (FI); Ero Carrera, Zurich (CH)

(73) Assignee: E-Secure Corporation, Helsinki (FI)

( * ) Notice: Subject to any disclaimer, the term of this patent is extended or adjusted under 35 U.S.C. 154(b) by 99 days.

(21) Appl. No.: 13/263,437

(22) PCT Filed: Apr. 8, 2010

(86) PCT No.: PCT/EP2010/054649
§ 371 (c)(1),
(2), (4) Date: Jan. 23, 2012

(87) PCT Pub. No.: WO2010/115960
PCT Pub. Date: Oct. 14, 2010

(65) Prior Publication Data
US 2012/0117648 A1    May 10, 2012

(30) Foreign Application Priority Data

Apr. 9, 2009   (GB) .................................. 0906180.5

(51) Int. Cl.
*H04L 29/06*   (2006.01)
(52) U.S. Cl.
USPC .......................................................... 726/22

(58) Field of Classification Search
USPC ....................................... 713/188; 726/22–24
See application file for complete search history.

(56) References Cited

U.S. PATENT DOCUMENTS

| | | | |
|---|---|---|---|
| 6,963,978 B1 | 11/2005 | Muttik et al. | 713/188 |
| 7,152,164 B1 | 12/2006 | Loukas | 713/188 |
| 2004/0153644 A1* | 8/2004 | McCorkendale et al. | 713/156 |
| 2005/0021994 A1 | 1/2005 | Barton et al. | 713/200 |
| 2009/0083852 A1 | 3/2009 | Kuo et al. | 726/22 |

FOREIGN PATENT DOCUMENTS

| | | | |
|---|---|---|---|
| WO | WO 03/046699 | * | 6/2003 |
| WO | WO 03/046699 A1 | | 6/2003 |

* cited by examiner

*Primary Examiner* — Ali Abyaneh
(74) *Attorney, Agent, or Firm* — Harrington & Smith

(57) ABSTRACT

A method for determining whether an electronic file stored at a client device is infected with malware. A server receives from the client device a request message that includes signature information of the electronic file. The server queries a database of signature information. If the signature information corresponds to signature information stored on the database, a determination is made as to whether the electronic file is malware. If the signature information does not correspond to signature information stored on the database, a determination is made as to whether a number of further request messages for the electronic file are received from additional client devices within a time period. If fewer request messages are received within the time period, it is likely that the electronic file is malware.

11 Claims, 2 Drawing Sheets

MALWARE DETERMINATION

FIELD OF THE INVENTION

The present invention relates to the field of determining if an electronic file is malware.

BACKGROUND TO THE INVENTION

Malware is short for malicious software and is used as a term to refer to any software designed to infiltrate or damage a computer system without the owner's informed consent. Malware can include viruses, worms, trojan horses, rootkits, adware, spyware and any other malicious and unwanted software. Any client device, such as a desktop personal computer (PC), laptop, personal data assistant (PDA) or mobile phone, can be at risk from malware.

When a device is infected by malware the user may notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware. Current malware typically tries to stay invisible to the user so that whoever controls the malware can use it for their benefit, for example by capturing user credentials to online banks, sending spam, distributing malware to other users and so on.

Malware detection happens primarily at two different stages: pre-infection and post-infection. Pre-infection detection involves analyzing a piece of software before it is allowed to execute to determine whether it is malicious. Post-infection detection involves analyzing a computer system for a malware infection already present on the system by scanning through the files present in the system, looking at the processes in the system, searching possibly hidden files and processes, analysing network traffic leaving the computer and looking at other signs of a malware infection.

Behavioural analysis can be performed on a running computer system by looking at actions performed by various processes and then determining whether the actions taken by the process are typical for a piece of malware.

Detecting malware in the post-infection phase is especially challenging (it's also challenging at the pre-infection phase), as the malware authors design their software to be difficult to detect, often employing technology that deliberately hides the presence of malware on a system. For example, the malware application may not show up on the operating system tables that list currently running processes.

Client devices make use of anti-virus software to detect and possibly remove malware. This anti-virus software can make use of various methods to detect malware including scanning, integrity checking and heuristic analysis. Of these methods, malware scanning involves the anti-virus software examining files for a virus fingerprint or "signature" that is characteristic of an individual malware program. Typically, this requires that the anti-virus software has a database containing the signatures. When the provider of the anti-virus software identifies a new malware threat, the threat is analysed and its signature is extracted. The malware is then "known" and its signature can be supplied as updates to the anti-virus software database. However, scanning files for malware can consume significant processing resources potentially resulting in a reduction in the performance of a computing device.

Recently, the number of malware samples has increased greatly, with the result that the size of the signature databases for anti-virus products has grown significantly.

A problem with detecting malware using signature methods is that malware authors may specifically create large amounts of unique samples to make the traditional local signature mechanisms obsolete.

A further problem is that malware is increasingly written with a specific target in mind, and so malware infecting a client device may be unique. They are created to target a specific company or even an individual. As the malware is unique, it becomes more difficult to detect. It is also typically tested against the anti-virus software used by the target company/individual to make sure the signature and other mechanisms don't detect the sample. Typically, the payload of two malware samples created by the same person will be the same. However, malware is often protected by using a protective layer using an obfuscating packer to obfuscate or encode the malware in a way that makes it difficult to detect using a signature for the payload. By varying the method or manner of obfuscation, each malware can be uniquely tailored to a particular target whilst the malware payload remains the same. However, two different samples of unique malware may have completely different outer level signatures despite having the same payload.

There are different methods for handling malware protected by an obfuscating packer. One is to detect the malware by the type of obfuscation layer being used. This method works well where the the protective layer is used only by the malware, but causes problems if the protective layer is used both by the malware and by legitimate applications. The other method is to remove the protection layer (by emulation or otherwise) to reveal the malware payload code. This can consume more processing resources than is desirable, especially on client devices such as mobile telephones that have limited processing resources. There might also be code that bypasses the unpacking mechanisms or breaks out from the emulation environment.

In addition to unique malware created by using a unique protective layer, it is also possible for the malware payload to be written specifically with a target in mind. In this case it will have a unique signature regardless of whether a protective layer is used.

SUMMARY OF THE INVENTION

It is an object of the invention to provide a method of detecting malware where the malware is unique or rare. According to a first aspect of the invention, there is provided a method of making a determination of whether an electronic file stored at a client device is malware. A server receives a request message from the client device. The request message includes signature information of the electronic file. The server queries a database used for storing signature information of a multiplicity of electronic files. If the signature information of the electronic file corresponds to signature information stored on the database, a determination is made as to whether the electronic file is malware. If, on the other hand, the signature information of the electronic file does not correspond to signature information stored on the database, a determination is made as to whether a predetermined number of further request messages relating to the electronic file are received from further client devices within a predetermined time period. If fewer than the predetermined number of further request messages are received within the predetermined time period, it is likely that the electronic file is malware. The result of the determination is then sent to the client device.

As a preferred option, in the event that fewer than the predetermined number of further requests are received within the predetermined time period, the method comprises performing further malware checks.

The server may send a request to the client device for the client device to send the file to a verification server for verification that the electronic file is not infected with malware.

As an option, the signature information of the multiplicity of electronic files stored at the database includes signature information of clean copies of electronic files. If the signature information relating to the electronic file corresponds to signature information of a clean copy of an electronic file stored at the database, then it can be determined that the electronic file is not malware. As a further option, the signature information of the multiplicity of electronic files stored at the database includes signature information of known malware. In this case, if the signature information relating to the electronic file corresponds to signature information of known malware stored at the database, it can be determined that the electronic file is malware.

According to a second aspect of the present invention, there is provided a server for use in a communication network. The server is provided with a receiver for receiving from a client device a request message that includes information relating to an electronic file. A processor is also provided for querying a database storing signature information of a multiplicity of electronic files. The processor is arranged to determine if the signature information of the electronic file corresponds to signature information stored on the database. If such a determination is made, then the processor determines whether the electronic file is malware, and if it is determined that signature information relating to the electronic file does not correspond to signature information stored on the database, then the processor is arranged to determine whether a predetermined number of further request messages relating to the electronic file are received from further client devices within a predetermined time period. If fewer than the predetermined number of further request messages are received within a predetermined time period, then the processor is arranged to determine that the electronic file is likely to be malware.

As an option, the server is provided with a transmitter for sending the result of the determination to the client device.

The processor is optionally arranged to, in the event that fewer than a predetermined number of further requests are received within a predetermined time period, perform further malware checks.

As an option, the signature information of the multiplicity of electronic files stored at the database includes signature information of clean copies of electronic files. The processor is arranged to, in event that the signature information relating to the electronic file corresponds to signature information of a clean copy of an electronic file stored at the database, determine that the electronic file is not malware.

As a further option, the signature information of the multiplicity of electronic files stored at the database includes signature information of known malware. The processor is arranged to, in event that the signature information relating to the electronic file corresponds to signature information of known malware stored at the database, determine that the electronic file is malware.

According to a third aspect of the invention, there is provided a computer program, comprising computer readable code which, when run on a server, causes the server to behave as a server as described above in the second aspect of the invention.

According to a fourth aspect of the invention, there is provided a computer program product comprising a computer readable medium and a computer program as described in the third aspect of the invention, wherein the computer program is stored on the computer readable medium.

DETAILED DESCRIPTION OF CERTAIN EMBODIMENTS

The inventors have realised that whilst there are many unique (or rare) examples of malware in existence, it is much less likely that a binary associated with a regular application will be unique among the users of a communication network such as the Internet. For example, the binaries associated with Microsoft Windows XP™ are the same for all users who have the same version of Windows XP installed (for example, a version using the same language and the same service pack) on their client device. Similarly, the binaries for third party applications such as Adobe Acrobat™ are the same for all users who have Windows XP installed on their client device. If a binary stored at the client device is unique, then there is an increased likelihood that the binary is suspicious and may in fact be unique malware. Note that whilst the term "unique" is used for the malware in the examples described below, the invention encompasses malware that is aimed at a handful of users or companies, and not generic malware.

A typical application when released will be taken into use by several users within minutes of its release.

Figure 1:
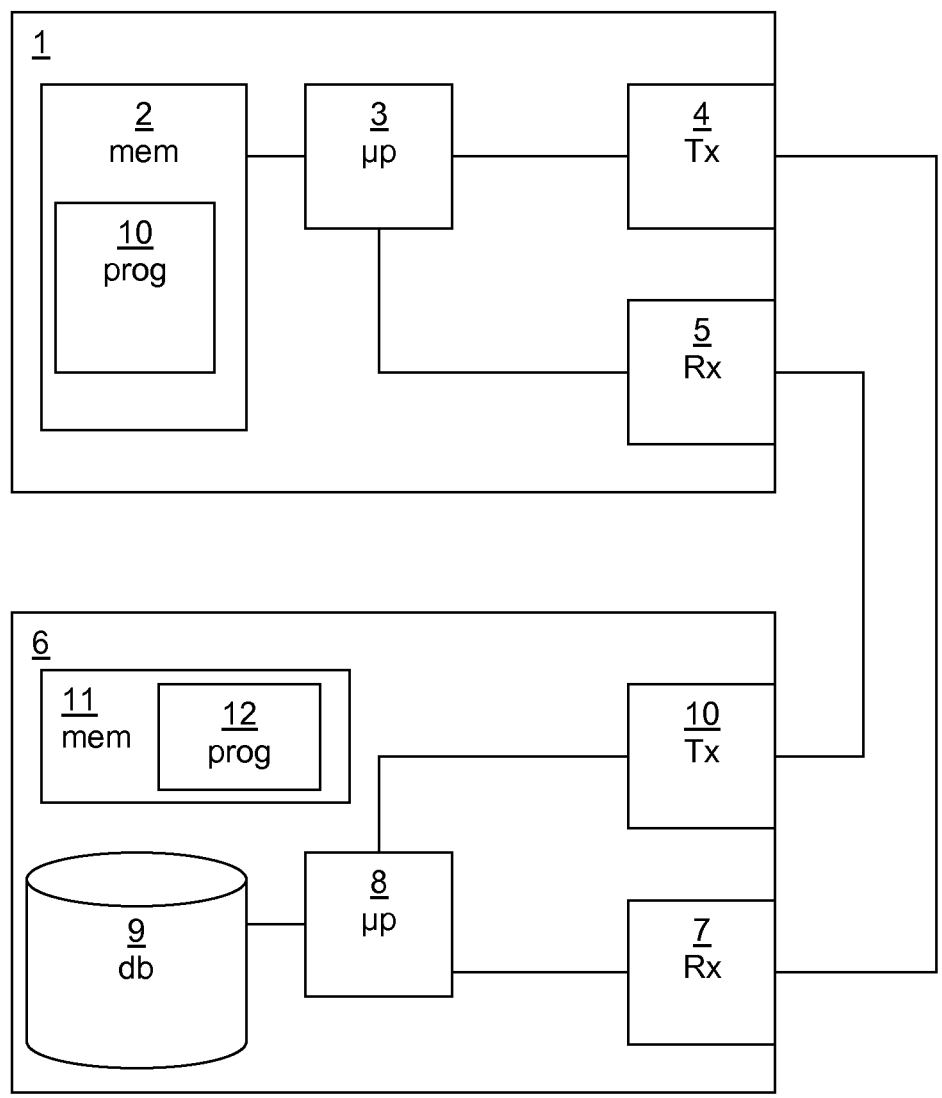
FIG. 1 illustrates schematically in a block diagram a network architecture according to an embodiment of the invention.

FIG. 1 illustrates a client device 1 having a computer readable medium in the form of a memory 2 for storing electronic files, a processor 3, a transmitter 4 for sending signalling to external nodes, and a receiver 5 for receiving signalling from external nodes.

An anti-virus application is installed into the memory 2 of the client device 1. When the anti-virus application is run, it starts to scan electronic files in the memory 2 (or received from a network, a removable memory or otherwise). When an electronic file is identified that may be a legitimate file or may be associated with malware, a network look-up is performed base on key parts of the file. The key parts of the file are signature information that can be used to identify the file and to describe the structure of the file. Examples of signature information include an electronic fingerprint (SHA-1, MD5 or similar, of the whole file or parts of it), file name, location, author, date of creation, date of modification, associated registry settings, version number and so on.

The network lookup is performed by sending a request message using the transmitter 4 to a server 6. The server 6 has a receiver 7 that receives the request message, which is processed by a processor 8. The server 6 has access to a database 9. In the example of FIG. 1, the database 9 is shown as part of the server 6, although it will be appreciated that the database may be accessed remotely by the server.

The database 9 holds information on known malware and also on files provided by trusted software vendors. Examples of electronic files for major operating systems, applications, games and so on are stored in the database.

The processor 8 compares the received electronic file information with information retrieved from the database. If it is determined that the electronic file stored in the memory 2 matches a corresponding clean electronic file retrieved from the database 9, then the electronic file stored in the client device memory 2 is unlikely to be infected with malware, and a response message is sent to the client device via a transmitter 10 confirming that the electronic file is not infected with malware.

If, on the other hand, the electronic file stored in the memory 2 does not match a file stored in the database 9, then the file is either unknown to the database 9 or is a unique piece of software. In this case, further action is taken.

The server 6 informs the client device 1 that the electronic file stored in the memory is suspicious and may ask the client device 1 to recheck the status after a predetermined time period. Alternatively, the server 6 may simply send updates of the file status to the client device 1. In one embodiment of the invention, the client device 1 is requested to send a copy of the file to the server 6 or to another server for further analysis to determine whether or not it is infected with malware.

In the case where the electronic file stored at the memory 2 does not match with a file stored in the database 9, there is a chance that the electronic file is part of a new legitimate application that is previously unknown to the database 9. The server 6 waits for a predetermined period of time (for example, 15 minutes) to ascertain whether request messages for that file are received from other client devices. If a sufficient number of other client devices send a request message for the same electronic file, then it is likely that the electronic file is part of a new legitimate application, or is not unique malware. In this case, other methods (not described herein) may be used to ascertain whether the file is clean. If no other request messages (or very few request messages) are received in the predetermined time period, then it is more likely that the electronic file is infected with malware (or is malware).

In a further embodiment of the invention, once it is determined that the electronic file stored at the memory 2 does not match with a file stored in the database, the client device 1 is prompted to verify that the electronic file stored in the memory comes from a trusted source and is not malware or infected with malware.

The memory 2 at the client device 1 may also be used to store a computer programme 10 comprising instructions that causes the client device 1 to describe above. Similarly, the server 6 may also be provided with a computer readable medium in the form of a memory 11. A computer programme 12 is stored in the memory which, when executed by the processor 8, causes the server 6 to run as described above.

Figure 2:
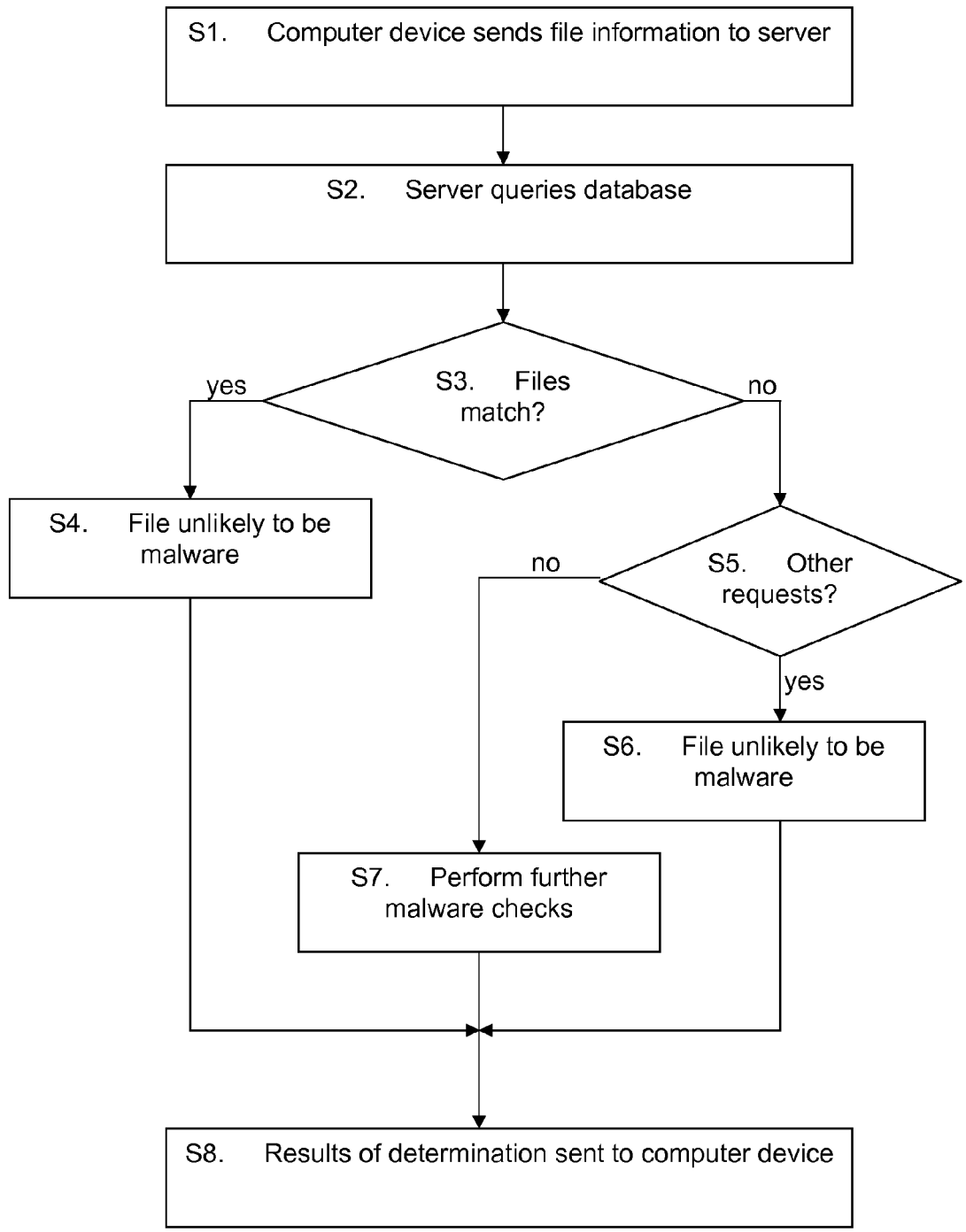
FIG. 2 is a flow diagram showing the steps of an embodiment of the invention.

FIG. 2 is a flow chart illustrating steps of the invention, with the following numbering corresponding to the numbering of FIG. 2:

S1. The client device 1 determines that an electronic file stored in the memory may be infected with malware, and sends information relating to the electronic file or key parts from the electronic file to the server 6.

S2. The server 6 queries the database 9 to look for similar electronic files.

S3. A determination is made of whether a corresponding version of the file exists on the database 9. This determination may be made against known malware or clean versions of files stored at the database 9.

S4. If a corresponding clean version of the electronic file exists on the database 9, the electronic file is unlikely to be malware, and the process moves to step S8. Similarly, if a corresponding version of malware exists on the database 9, then the electronic file is determined to be malware, and the process moves to step S8.

S5. If a corresponding clean version of the electronic file does not exist on the database 9, then a check is made to ascertain whether any other client devices have sent information relating to the electronic file within a predetermined time period.

S6. If enough other client devices have sent the information relating to the electronic file, then the electronic file is unlikely to be unique malware and is more likely to be a new file that is not yet provisioned on the database 9 (which may be clean or malware). Further checks may be made, and if it is determined that the electronic file is not malware or infected with malware, a copy is stored at the database 9 and marked as clean. If, on the other hand, it is determined that the file is malware or infected with malware, then the file is marked as being malware. The process then continues at step S8.

S7. If no (or only a few) other client devices have sent the information relating to the electronic file, then the electronic file is likely to be malware. Further checks may be made on the file.

S8. The results of the determination are sent to the client device 1.

It will be appreciated by the person of skill in the art that various modifications may be made to the above described embodiment without departing from the scope of the present invention. For example, the examples given above show the client device having only one memory. It will be appreciated that the memory may be a hard drive, an optical drive, a Random Access Memory, or any other type of memory, and that more than one memory may be provided. Furthermore, the memory may be remotely connected to the client device.

The invention claimed is:

1. A method of making a determination of whether an electronic file stored at a client device is malware, the method comprising:
    receiving at a server from the client device a request message comprising signature information of the electronic file;
    querying a database storing signature information of a multiplicity of electronic files;
    if the signature information of the electronic file corresponds to signature information stored on the database, determining whether the electronic file is malware,
    in the event that the signature information of the electronic file does not correspond to signature information stored on the database, determining whether a predetermined number of further request messages relating to the electronic file are received from further client devices within a predetermined time period, and in the event that fewer than the predetermined number of further request messages are received within the predetermined time period, determining that the electronic file is likely to be malware, and in the event that more than the predetermined number of further request messages are received within the predetermined time period, determining that the electronic file is not likely to be malware; and
    sending the result of the determination to the client device.

2. The method according to claim 1, further comprising: in the event that fewer than the predetermined number of further requests are received within the predetermined time period, performing further malware checks.

3. The method according to claim 1, further comprising:
    sending to the client device a request for the client device to send the file to a verification server for verification that the electronic file is not malware.

4. The method according to claim 1, wherein the signature information of the multiplicity of electronic files stored at the database includes signature information of clean copies of electronic files; and if the signature information relating to the electronic file corresponds to signature information of a clean copy of an electronic file stored at the database, determining that the electronic file is not malware.

5. The method according to claim 1, wherein the signature information of the multiplicity of electronic files stored at the database includes signature information of known malware; and if the signature information relating to the electronic file corresponds to signature information of known malware stored at the database, determining that the electronic file is malware.

6. A computer program stored on a non-transitory computer readable medium, comprising computer readable code configured to, when run on a server, cause the server to perform the method of claim 1.

7. A server for use in a communication network, the server comprising:
a hardware receiver for receiving from a client device a request message, the request message including information relating to an electronic file;
a processor for querying a database storing signature information of a multiplicity of electronic files, the processor being arranged to determine if the signature information of the electronic file corresponds to signature information stored on the database, and in the event that such a determination is made, determining whether the electronic file is malware, and if is determined that signature information relating to the electronic file does not correspond to signature information stored on the database, determining whether a predetermined number of further request messages relating to the electronic file are received from further client devices within a predetermined time period, and in the event that fewer than the predetermined number of further request messages are received within a predetermined time period, determining that the electronic file is likely to be malware, and in the event that more than the predetermined number of further request messages are received within the predetermined time period, determining that the electronic file is not likely to be malware.

8. The server according to claim 7, further comprising a transmitter for sending the result of the determination to the client device.

9. The server according to claim 7, wherein the processor is further arranged to, in the event that fewer than a predetermined number of further requests are received within a predetermined time period, perform further malware checks.

10. The server according to claim 7, wherein the signature information of the multiplicity of electronic files stored at the database includes signature information of clean copies of electronic files; and
the processor is arranged to, in event that the signature information relating to the electronic file corresponds to signature information of a clean copy of an electronic file stored at the database, determine that the electronic file is not malware.

11. The server according to claim 7, wherein the signature information of the multiplicity of electronic files stored at the database includes signature information of known malware; and
the processor is arranged to, in event that the signature information relating to the electronic file corresponds to signature information of known malware stored at the database, determine that the electronic file is malware.

* * * * *

UNITED STATES PATENT AND TRADEMARK OFFICE
CERTIFICATE OF CORRECTION

PATENT NO.       : 8,726,377 B2
APPLICATION NO.  : 13/263437
DATED            : May 13, 2014
INVENTOR(S)      : Jussi Kallio et al.

Page 1 of 1

It is certified that error appears in the above-identified patent and that said Letters Patent is hereby corrected as shown below:

On the Title Page:
Assignee: "E-Secure Corporation" should be deleted and --F-Secure Corporation-- should be inserted.

Signed and Sealed this
Twenty-ninth Day of July, 2014

Michelle K. Lee
*Deputy Director of the United States Patent and Trademark Office*